Jan. 11, 1955          H. J. VAN DOORNE                    2,699,222
               VEHICLE SUPPORTED ON BALANCING LEVERS
                     CARRYING TANDEM DRIVEN WHEELS
Filed April 14, 1952                                  3 Sheets-Sheet 2

INVENTOR
Hubertus Josephus Van Doorne

BY Henderoth, Lind & Ponack

ATTORNEYS

Jan. 11, 1955   H. J. VAN DOORNE   2,699,222
VEHICLE SUPPORTED ON BALANCING LEVERS
CARRYING TANDEM DRIVEN WHEELS
Filed April 14, 1952   3 Sheets-Sheet 3

INVENTOR
Hubertus Josephus Van Doorne
BY Henderoth, Lind + Ponack
ATTORNEYS.

United States Patent Office 2,699,222
Patented Jan. 11, 1955

2,699,222

VEHICLE SUPPORTED ON BALANCING LEVERS CARRYING TANDEM DRIVEN WHEELS

Hubertus Josephus van Doorne, Deurne, Netherlands

Application April 14, 1952, Serial No. 282,105

Claims priority, application Netherlands April 21, 1951

2 Claims. (Cl. 180—23)

The invention relates to a cross-country vehicle with driven rear wheels and with front wheels which may be driven, if desired.

For cross-country vehicles it is desirable to drive independently mounted wheels by means of a worm and a worm wheel in order to locate the driving shafts for the wheels as high as possible, thus avoiding the danger of the driving shafts being damaged by unevennesses of the ground. Although a worm drive is preferable for vehicles of this type, the invention is not restricted to such a drive but includes also a vehicle with any other type of wheel drive, e. g. by bevel gears. Whatever the driving system may be, the large amplitudes of wheel arms of a cross-country vehicle when driving over uneven ground might involve unfavorable angles over which the drive to the wheels is transmitted by universal joints if no special precautions would have been taken.

The object of the present invention is to provide a cross-country vehicle in which the driving wheels are arranged in a way to be able to move up and down over great amplitudes without causing detrimental effects to the different parts of the vehicle.

Another object of the invention is to provide a cross-country vehicle in which two wheels of a wheel set are arranged in tandem at each side of the vehicle on balancing levers without requiring torque members or similar means in order to keep gear cases connected to said balancing levers in upright position.

Another object of the invention is to provide a central driving gear for driving the rear wheels and at will the front wheels, the rear wheels and the front wheels at one side of the vehicle being movable indepenedently from the wheels at the other side of the vehicle.

Another object of the invention is to provide a cross-country vehicle having spare wheels or auxiliary wheels so arranged that these wheels come into action for supporting the vehicle when driving over a ridge or when driving into a deep trench, thus avoiding parts of the vehicle from being damaged by contact with an unevenness of the ground.

Another object of the invention is to provide a vehicle in which the spare wheels or auxiliary wheels are adapted to assist to propel the vehicle if by special conditions of an uneven ground the front wheels have lost contact therewith.

Another object of the invention is to provide a cross-country vehicle in which the fore-mentioned central driving gear is also adapted to be connected or disconnected to the spare wheels or auxiliary wheels which are arranged on a higher level than the front wheels and rear wheels in their normal position.

A further object of the invention is to provide a cross-country vehicle which fulfils the requirements of a military tractor on uneven ground without track laying means better than the known wheel-supported military vehicles.

An embodiment of a vehicle according to the invention is shown in the accompanying drawings. In these drawings.

Figure 1:
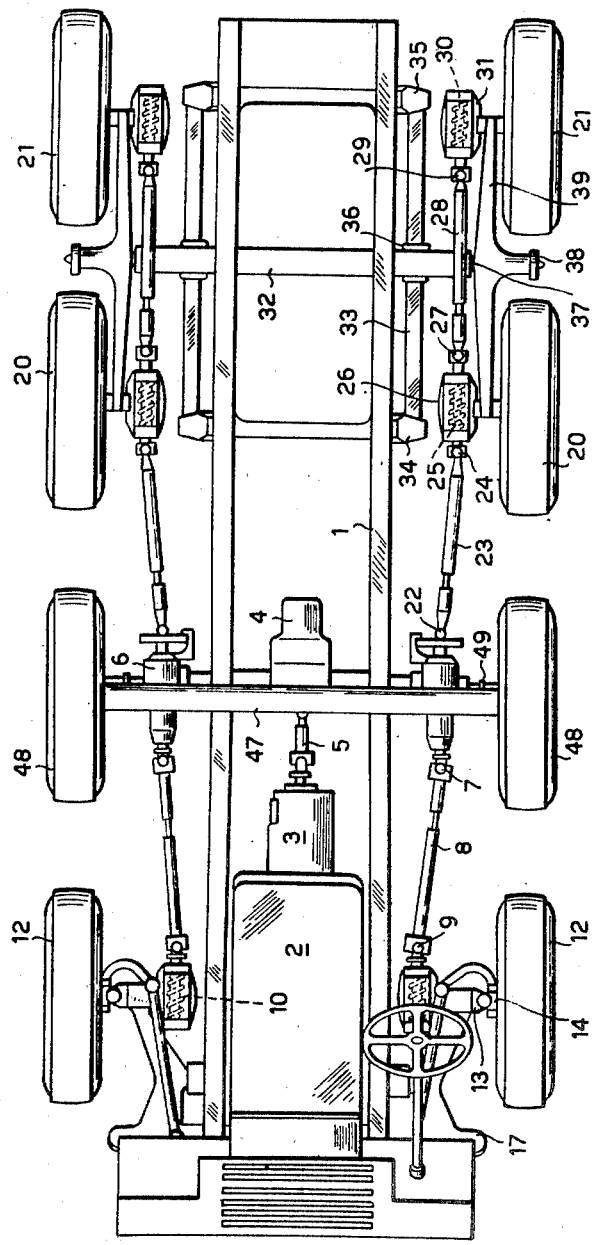
Fig. 1 is a plan view of the chassis of the vehicle.
Figure 2:
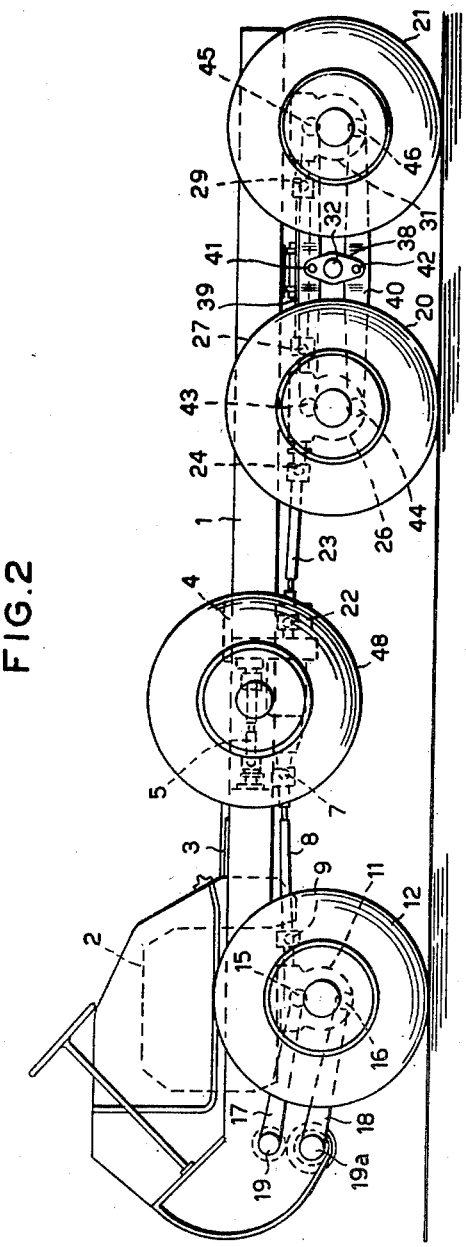
Fig. 2 is a side view of the vehicle chassis shown in Fig. 1.
Figure 3:
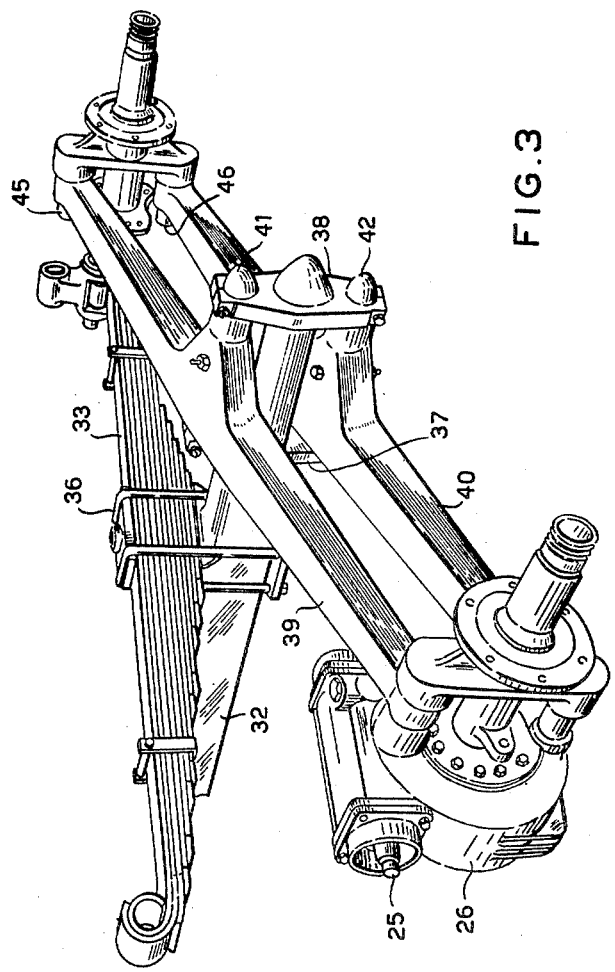
Fig. 3 is a perspective view of a part of the rear axle with the double balancing levers, however, without rear wheels.

The vehicle has a frame 1, an engine 2, a change speed gear 3 and a central distribution gear 4, connected to the change speed gear by a transmission shaft 5.

The central distribution gear 4 drives two auxiliary distribution gears 6 mounted on both sides of the frame 1. Each of said auxiliary transmission gears drives, via a universal joint 7, a telescoping transmission shaft 8 and a universal joint 9, a worm 10 which by means of a worm wheel rotatably arranged within a worm wheel casing 11 drives the corresponding front wheel 12.

A wheel bracket 13 in which a wheel swivel 14 is adapted to oscillate, is connected by means of pivots 15 and 16 to wheel arms 17 and 18 which are adapted to swing up and down about pivots 19 and 19a carried by the vehicle frame. The wheel arms 17 and 18 are parallel to each other while the connecting lines between the pivots 15 and 16 and between the pivots 19 and 19a are also parallel to each other so that the wheel bracket 13 and the worm wheel casing 11 secured thereto are guided by a parallel guide in their up and down movement.

The rear wheels 20 and 21 are driven from the auxiliary transmission gears 6 in the following manner. The longitudinal shaft of said transmission gears is provided with a universal joint 22 which by means of a telescoping transmission shaft 23 and a universal joint 24 drives a worm 25 which is rotatably supported in a worm wheel casing 26. The rear end of the worm 25 is by means of a universal joint 27, a telescoping transmission shaft 28 and a universal joint 29 connected to a worm 30 which is rotatably supported in a worm wheel casing 31. The worm wheels (not shown) in the worm wheel casings 26 and 31 drive the rear wheels 20 and 21 respectively.

A rear axle 32 supports the rear portion of the vehicle by means of longitudinal springs 33 which are connected to the frame 1 by spring brackets 34 and 35 and by spring straps 36 to the rear axle 32.

Vertical flanges 37 and 38 are secured to each end of the rear axle 32 extending outside of the springs 33 and between these flanges balancing levers 39 and 40 are adapted to oscillate about pivots 41 and 42. The front ends of said balancing levers 39 and 40 carry the worm wheel casing 26 by means of pivots 43 and 44, while the worm wheel casing 31 is connected by means of pivots 45 and 46 to the rear ends of said balancing levers.

If one of the rear wheels 20 when driving on uneven ground is lifted by an unevenness of the ground, the balancing levers 39 and 40 oscillate clockwise about the pivots 41 and 42 so that the rear wheel 21 falls relative to the frame 1. The connecting lines between the pivots 43 and 44 and between the pivots 45 and 46 remain parallel to the connecting line between the pivots 41 and 42, so that the worm wheel casings 26 and 31 go up and down remaining in the same upright position. The driving couples and the braking couples are transmitted by the balancing levers 39 and 40 to the flanges 37 and 38 of the rear axle 32 and are taken by this axle without the necessity of torque members.

A cross beam 47 of the frame carries rotatable spare or auxiliary wheels 48 in the same vertical planes as the front wheels 12 and the rear wheels 20 and 21 at each side of the vehicle. Since the spare or auxiliary wheels 48 are rotatable they assist to support the vehicle when driving in very uneven country, e. g. when driving over a ridge or when driving into a deep trench. A cross shaft 49 (Fig. 1) extending from each of the auxiliary transmission gears 6 outwardly enables the driver to couple spare wheels 48 to the drive train when found desirable.

Having now ascertained and described the invention what I claim is:

1. In across-country vehicle comprising at each side of the vehicle a set of two worm driven rear wheels arranged in tandem and provided with a worm wheel casing for each of said wheels: two similar rigid balancing levers, one arranged above the other, the free ends of which are connected to the forward and rearward worm wheel casings, respectively, by means of pivots, one pivot of each worm wheel casing being arranged above and the other below the axis of rotation of the corresponding wheel, and a member resiliently connected to the vehicle frame and upon which the intermediate portions of said balancing levers are pivotally mounted for oscillation in a vertical plane.

2. A cross-country vehicle comprising two rear wheels arranged in tandem at each side of the vehicle, supports resiliently mounted on said vehicle, a pivotal connecting members arranged one above the other and connected to said supports for pivotal movement in a vertical plane, worm wheel casings on said connecting members and guided in parallelism, worm wheel drives in said casings, said connecting members comprising two similar rigid balancing levers, and pivots connecting the free ends of said balancing levers to said worm wheel casings and mounted above and below the axes of the wheels so that said balancing levers serve practically equally as bearing arms for said wheels.

References Cited in the file of this patent

UNITED STATES PATENTS

| | | |
|---|---|---|
| 1,868,827 | Guy | July 26, 1932 |
| 2,176,171 | Flowers | Oct. 17, 1939 |
| 2,352,301 | Welles | June 27, 1944 |
| 2,439,659 | Julien | Apr. 13, 1948 |

FOREIGN PATENTS

| | | |
|---|---|---|
| 302,893 | Italy | Nov. 11, 1932 |